(12) United States Patent
Chang

(10) Patent No.: US 6,375,483 B1
(45) Date of Patent: Apr. 23, 2002

(54) CARD DETECTING SWITCH

(75) Inventor: Jen-Jou Chang, Yung-Ho (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/800,634

(22) Filed: Mar. 6, 2001

(30) Foreign Application Priority Data

Dec. 15, 2000 (TW) .......................................... 089221827

(51) Int. Cl.⁷ ............................................... H01R 29/00
(52) U.S. Cl. .......................... 439/188; 439/489; 439/64
(58) Field of Search ................................ 439/188, 630, 439/600, 64, 377, 489; 235/441; 200/43.04

(56) References Cited

U.S. PATENT DOCUMENTS

| | | | |
|---|---|---|---|
| 5,667,397 A | * | 9/1997 | Broschard, III et al. .... 439/188 |
| 6,004,155 A | * | 12/1999 | Wu .............................. 439/489 |
| 6,086,426 A | * | 7/2000 | Chang ........................ 439/630 |
| 6,099,335 A | * | 8/2000 | Chang ........................ 439/188 |
| 6,120,310 A | * | 9/2000 | Chang ........................ 439/188 |
| 6,126,464 A | * | 10/2000 | Chang ........................ 439/489 |
| 6,130,387 A | * | 10/2000 | Bricaud et al. .......... 200/43.04 |
| 6,132,229 A | * | 10/2000 | Wu .............................. 439/188 |
| 6,135,809 A | * | 10/2000 | Asakawa .................... 439/489 |
| 6,159,051 A | * | 12/2000 | Chang ........................ 439/188 |

\* cited by examiner

Primary Examiner—Gary Paumen
(74) Attorney, Agent, or Firm—Wei Te Chung

(57) ABSTRACT

An electrical connector (1) has a housing (10) receiving signal contacts (12) therein, a switch (14) for detecting full insertion of an electrical card (2), and a guide frame (13) supporting the card therein and slidably engaged with the housing. The switch includes a fixed contact (15) and a resilient contact (16), which are in contact with each other when the switch is in a normal position. The fixed contact has a contact piece (150) connected to a first switch trace (31) of a PCB (3). The resilient contact has a solder tab (161) connected to a second switch trace (30) of the PCB, and a spring arm (162) for contacting the contact piece. The guide frame has a wedge (136) for disengaging the spring arm from the contact piece when the card is fully inserted into the housing.

1 Claim, 5 Drawing Sheets

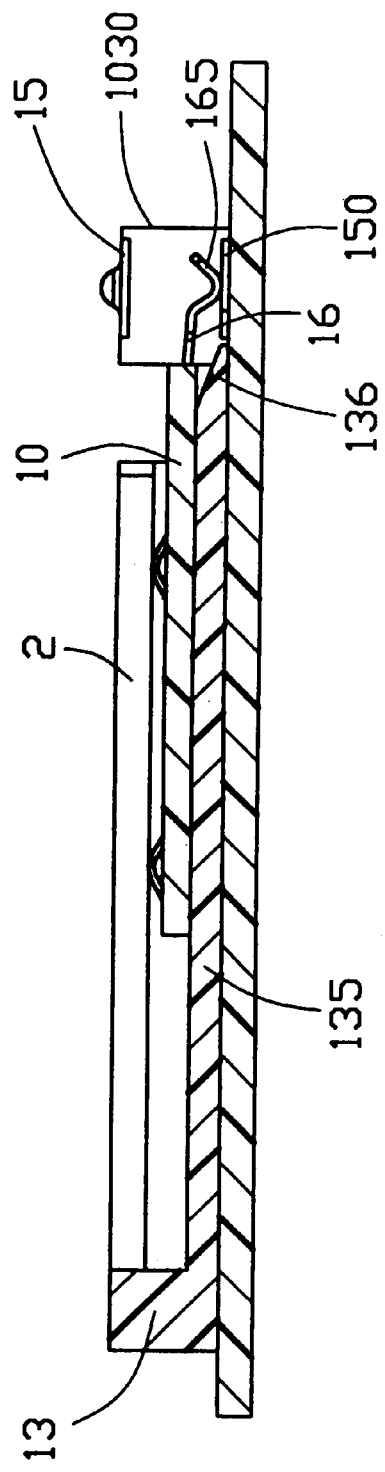
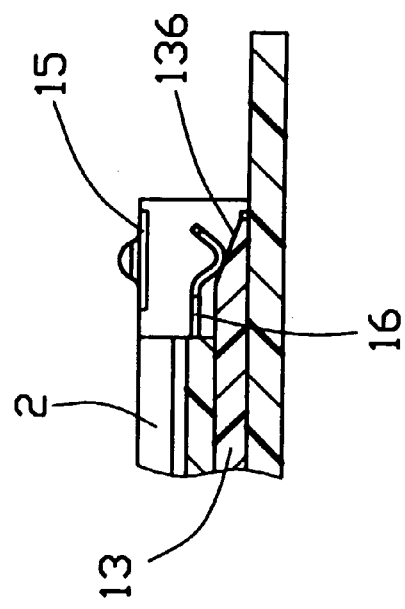

CARD DETECTING SWITCH

FIELD OF THE INVENTION

The present invention relates to a switch which interconnects an electrical card and a printed circuit board, and particularly to a switch for detecting full insertion of an electrical card in a housing mounted on a printed circuit board.

BACKGROUND OF THE INVENTION

A conventional electrical connector is disclosed in U.S. Pat. No. 6,130,387. In this patent, an electrical connector has a built-in switch assembly for detecting a smart card (not shown) that has reached a fully inserted position in the connector. The switch assembly includes an insulative support for mounting on a circuit board, and a switch contact with a pedal extending above an upper face of the support. The switch contact is downwardly deflected by a card as the card reaches its fully inserted position. The switch contact has a connecting tab permanently engaged to a first switch trace on the circuit board, and a contact suspended over a second switch trace on the circuit board. When the pedal is depressed, the contacting part is actuated to press against the second trace and thereby close the switch.

Unfortunately, because the pedal extends above the upper face of the support, the pedal tends to push the card upwardly. This results in an unreliable connection between the card and the connector. Furthermore, the card must be pushed with enough force to close the switch. The card therefore tends to yield or become damaged after repeated use, often resulting in erroneous reading or writing of the card.

Hence, an improved electrical card connector is needed to overcome the above-mentioned deficiencies of current electrical card connectors.

SUMMARY OF THE INVENTION

Accordingly, a primary object of the present invention is to provide an electrical connector having a card detecting switch which prevents mis-connection between a card and the connector.

Another object of the present invention is to provide an electrical connector having a card detecting switch which avoids distortion of cards received in the connector.

An electrical connector for connecting an electrical card with a printed circuit board (PCB) has a housing receiving signal contacts therein, a switch for detecting full insertion of the card, and a guide frame slidably engaged with the housing. The switch includes a fixed contact and a resilient contact, which are in contact with each other when the switch is in a normal position. The fixed contact has a contact piece connected to a first switch trace of the PCB. The resilient contact has a solder tab connected to a second switch trace of the PCB, and a spring arm opposite the solder tab for contacting the contact piece. The guide frame has a wedge for disengaging the spring arm from the contact piece when the card is fully inserted into the housing.

In use, the guide frame with the card supported therein is slid toward the housing. When the card reaches its fully inserted position, the wedge is interposed between the contact piece of the fixed contact and the spring arm of the resilient contact, thereby breaking the connection therebetween and opening the switch.

Other objects, advantages and novel features of the invention will become more apparent from the following detailed description when taken in conjunction with the accompanying drawings.

BRIEF DESCRIPTION OF THE DRAWINGS

FIG. 3 is a cross-sectional view taken along line 3—3 of the FIG. 2;

FIG. 5 is a cross-sectional view taken along the line 5—5 of FIG. 4;

DETAILED DESCRIPTION OF THE INVENTION

Figure 1:
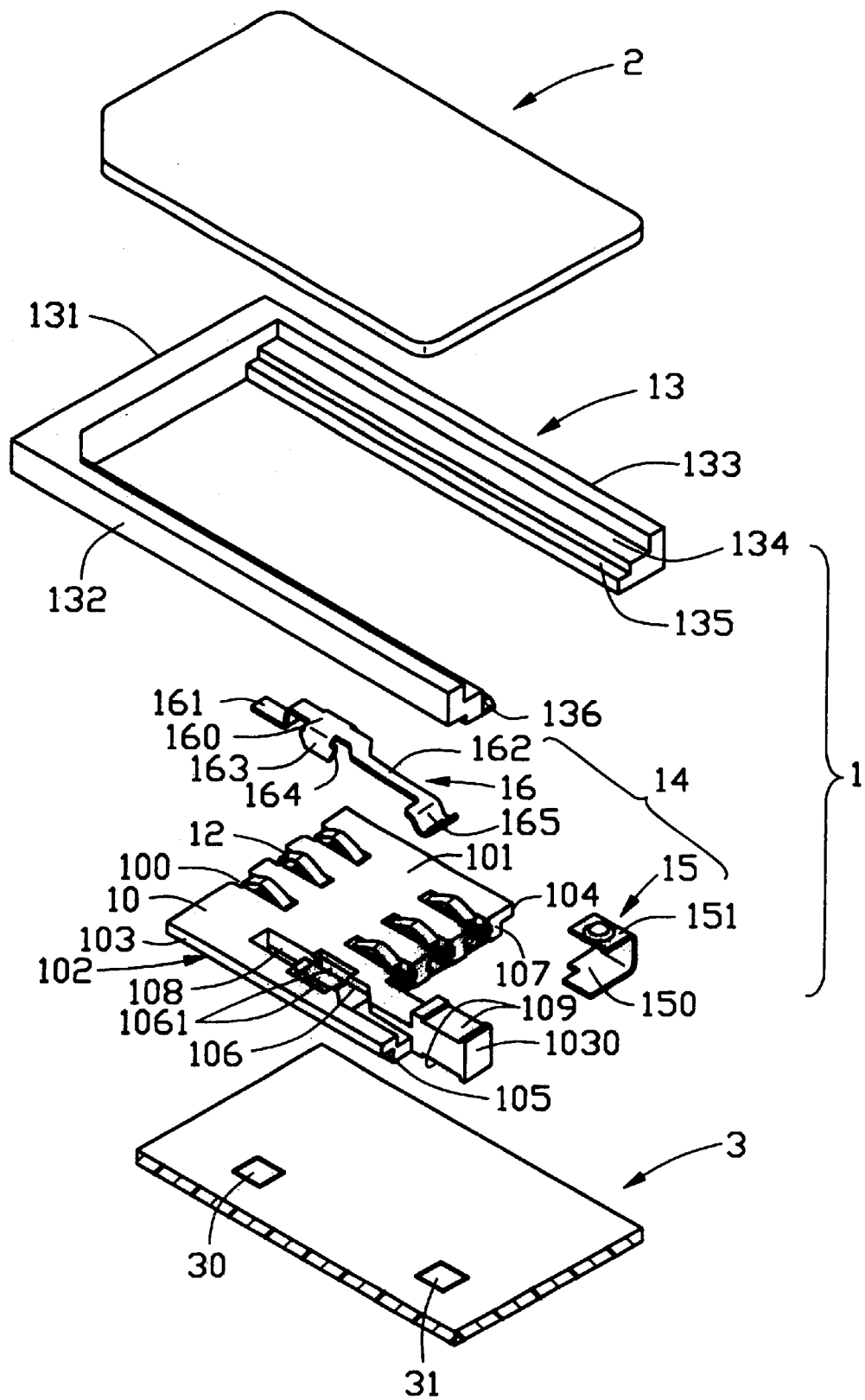
FIG. 1 is an exploded view of an electrical connector with a switch of the present invention, together with an electrical card and a portion of a printed circuit board.

Referring to FIG. 1, an electrical connector 1 in accordance with a first embodiment of the present invention comprises an insulative housing 10, a plurality of signal contacts 12 received in the housing 10, a switch 14 and an insulative guide frame 13 for guiding insertion of an electrical card 2 into the housing 10. The housing 10 defines two rows of passageways 100 therein for receiving the signal contacts 12. Since the structures and functions of the passageways 100 and the signal contacts 12 are well known to those skilled in the art, detailed descriptions thereof are omitted herein.

The housing 10 has a top surface 101, a bottom surface 102, a rear surface 107, a first sidewall 103 and a second sidewall 104 opposite the first sidewall 103. A guiding recess 105 is defined at the junction of the first sidewall 103 and the bottom surface 102. Another guiding recess 105 is defined at the junction of the second sidewall 104 and the bottom surface 102. A trough 106 is defined at the junction of the top surface 101 and the rear surface 107, beside the first sidewall 103. A pair of slots 1061 are respectively defined in the housing 10, at opposite sides of and in communication with the trough 106. A rectangular hole 108 is defined through the housing 10 between the top surface 101 and the bottom surface 102, in communication with a front extremity of the trough 106. A projection 1030 integrally extends from the rear surface 107 of the housing 10 near the first sidewall 103. The projection 1030 respectively defines a pair of grooves 109 in a top surface and a bottom surface (not labeled) thereof.

The switch 14 is provided to detect the card 2 as it reaches a fully inserted position in the connector 1. The switch 14 includes a fixed contact 15 and a resilient contact 16, which are each formed from a metal sheet.

The fixed contact 15 is generally U-shaped, and has a contact piece 150 and an arm 151 parallel to the contact piece 150.

The resilient contact 16 includes a substantially rectangular fixing section 160, a planar solder tab 161 extending from an end of the fixing section 106 and a spring arm 162 extending from an opposite end of the fixing section 160. A pair of fixing pieces 163 respectively depend from a middle portion of opposite longitudinal edges of the fixing section 160. A pair of barbs 164 are respectively formed on opposite sides of each fixing piece 163. An arcuate contact portion 165 forwardly extends from a distal end of the spring arm 162.

The guide frame 13 comprises a front bar 131, a first side bar 132 and a second side bar 133 opposite the first side bar 132. Each side bar 132 and 133 forms an inner first step 134 for supporting the inserted electrical card. Each side bar 132, 133 forms an inner second step 135 below the corresponding first step 134, for cooperatively engaging with a corresponding guiding recess 105 of the housing 10. A wedge 136 is formed at a rear end of the second step 135 of the first side bar 132. A sharpened tip (not labeled) is formed at a lower portion of a rear edge of the wedge 136.

A printed circuit board (PCB) 3 of a read/write apparatus (not shown) has a first switch trace 31 and a second switch trace 30 on an upper face (not labeled) thereof.

In assembly, the contact piece 150 and the arm 151 are respectively fixedly secured in the corresponding grooves 109 of the projection 1030 of the housing 10. The electrical connector 1 is mounted on the PCB 3. The contact piece 150 is permanently connected to the first switch trace 31 of the PCB 3, such as by way of soldering. The resilient contact 16 is received in the trough 16 of the housing 10. The fixing pieces 163 of the resilient contact 16 are respectively retained in corresponding slots 1061 of the housing 10. The solder tab 161 of the resilient contact 16 extends through the hole 108 of the housing 10. The solder tab 161 is permanently connected to the second switch trace 30, such as by way of soldering.

Figure 2:
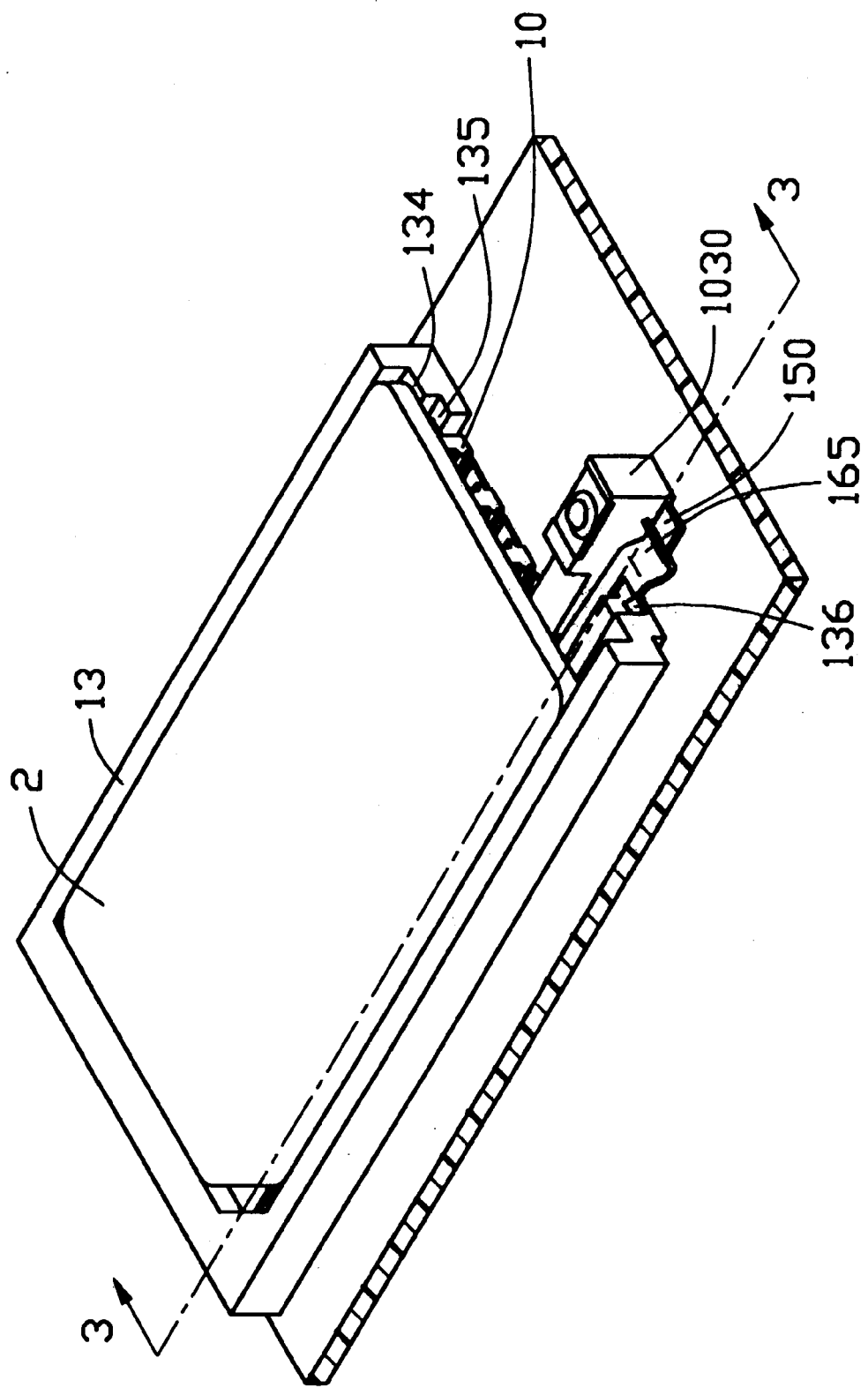
FIG. 2 is an assembled view of the FIG. 1, wherein the card is almost fully inserted into the connector, and the switch is in a closed position.

Referring to FIGS. 2 and 3, when the switch 14 is in a normal position, the contact portion 165 of the resilient contact 16 is in contact with the contact piece 150 of the fixed contact 15, thereby establishing an electrical connection therebetween. In use, the card 2 is supported on the first step 134 of the guide frame 13, and the second step 135 of the guide frame 13 cooperatively engages with the guiding recess 105 of the housing 10. The guide frame 13 is slid rearwardly along the guiding recess 105 toward the housing 10. The connection between the resilient contact 16 and the fixed contact 15 is maintained until just before the card 2 is fully inserted in the connector 1.

Figure 4:
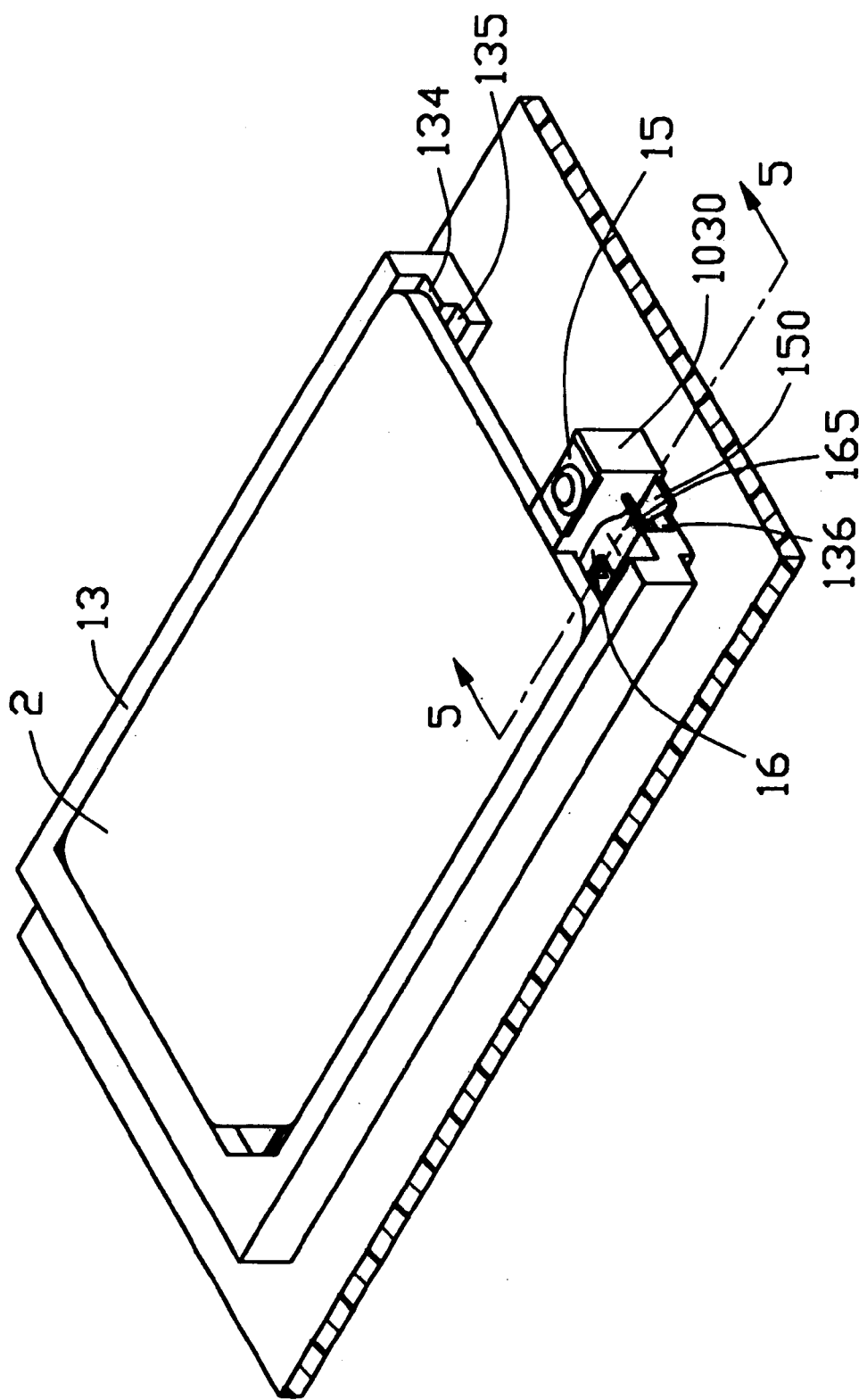
FIG. 4 is similar to FIG. 2, wherein now the card is fully inserted into the connector.

Referring to FIGS. 4 and 5, the card 2 is continued to be slid rearwardly until it has reached its fully inserted position. The wedge 136 is now interposed between the contact piece 150 of the fixed contact 15 and the contact portion 165 of the resilient contact 16, thereby breaking the connection therebetween and opening the switch 14.

Thus opening and closing of the switch 14 is directly actuated by the wedge 136, not by the card 2. The card 2 contacts only the signal contacts 12 of the connector 1. Therefore, reliable connection between the electrical connector 1 and the electrical card 2 is maintained, and distortion of the card 2 is avoided.

Figure 6:
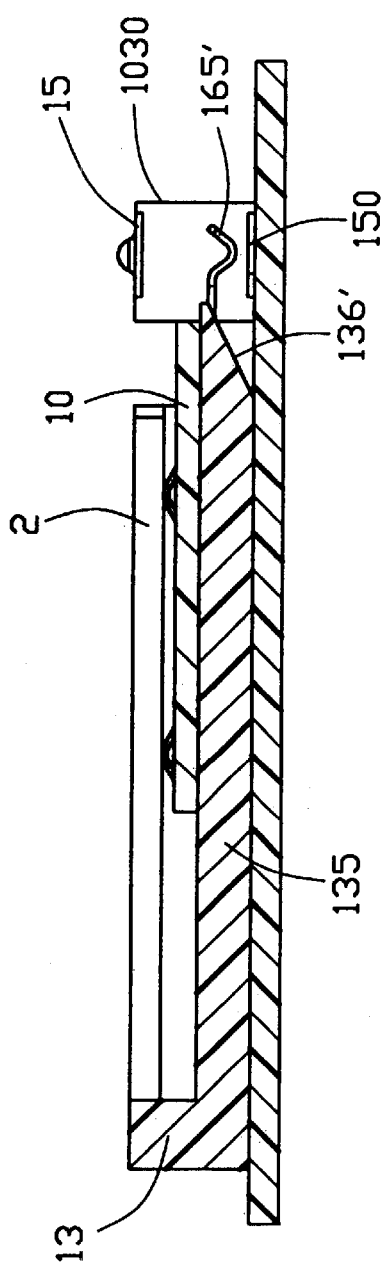
FIG. 6 is similar to FIG. 3, illustrating a second embodiment of the invention wherein an electrical card is almost fully inserted into an electrical connector.
Figure 7:
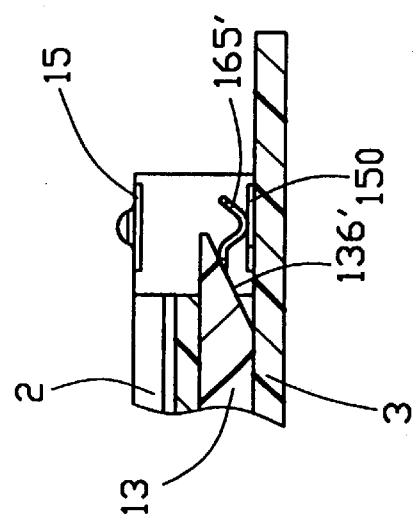
FIG. 7 is a view similar to FIG. 5, illustrating the second embodiment of the invention wherein now the card is filly inserted into the connector.

A second embodiment of the invention is shown in FIGS. 6 and 7. A wedge 136' of the guide frame 13 has a sharpened tip (not labeled) at an upper portion thereof. When the switch 14 is in a normal position, a contact portion 165' of the resilient contact 16 is suspended above the contact piece 150 of the fixed contact 15. When the card 2 reaches its fully inserted position, the, wedge 136' presses the contact portion 165' downwardly. The contact portion 165' contacts the contact piece 150, thereby establishing an electrical connection therebetween.

While the present invention has been described with reference to specific embodiments, the description is illustrative of the invention and is not to be construed as limiting the invention. Various modifications can be made to the preferred embodiments of the present invention by those skilled in the art without departing from the true spirit and scope of the invention as defined by the appended claims.

What is claimed is:

1. An electrical connector adapted for connecting an electrical card with a printed circuit board, comprising:

an insulative housing receiving a plurality of signal contacts therein;

a switch for detecting full insertion of the electrical card, comprising:
 a fixed contact mounted on the housing and including a contact piece adapted to be connected with a first switch trace of the printed circuit board; and
 a resilient contact received in the housing, the resilient contact including a solder tab adapted to be soldered to a second switch trace of the printed circuit board and a spring arm contactable with the contact piece of the fixed contact; and an insulative guide frame slidably engaged with the housing and adapted for guiding the card into the housing, the guide frame having a wedge for controlling contact between the spring arm of resilient contact and the contact piece of the fixed contact;

wherein the wedge is formed at a rear end of the guide frame and is interposed between the spring arm of the resilient contact and the contact piece of the fixed contact when the card is fully inserted into the connector, the wedge having a sharpened tip at a lower portion thereof;

wherein the wedge is formed at a rear end of the guide frame and pressed the spring arm of the resilient contact to contact the contact piece of the fixed contact when the card is fully inserted into the connector, the wedge having a sharpened tip at an upper portion thereof;

wherein the guide frame has two side bars at opposite sides thereof, each side bar forming a first step for supporting the card;

wherein each side bar forms a second step below the first step, and wherein the housing includes two sidewalls, each sidewall defining a guiding-recess for cooperatively engaging with the corresponding second step;

wherein the wedge is formed at a rear end of the second step;

wherein the housing defines a trough therein for receiving the resilient contact, a pair of slots therein on opposite sides of the trough, and a hole therein at a front extremity of the trough through which the solder tab of the resilient contact extends;

wherein the resilient contact comprises a fixing section, and a pair of fixing pieces depending from opposite sides of the fixing section for being retained in the corresponding slots of the housing;

wherein the fixed contact is generally U-shaped and has an arm above the contact piece, and wherein the housing defines two grooves therein for respectively fixedly securing the contact piece and the arm therein.

* * * * *